(12) United States Patent
Kato

(10) Patent No.: US 10,682,888 B2
(45) Date of Patent: Jun. 16, 2020

(54) PNEUMATIC TIRE

(71) Applicant: BRIDGESTONE CORPORATION, Tokyo (JP)

(72) Inventor: Keiichi Kato, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 421 days.

(21) Appl. No.: 15/321,119

(22) PCT Filed: Jun. 25, 2015

(86) PCT No.: PCT/JP2015/068314
§ 371 (c)(1),
(2) Date: Dec. 21, 2016

(87) PCT Pub. No.: WO2016/006460
PCT Pub. Date: Jan. 14, 2016

(65) Prior Publication Data
US 2017/0136826 A1 May 18, 2017

(30) Foreign Application Priority Data
Jul. 9, 2014 (JP) ................................. 2014-141474

(51) Int. Cl.
*B60C 11/03* (2006.01)
*B60C 11/13* (2006.01)
(52) U.S. Cl.
CPC ...... *B60C 11/0304* (2013.01); *B60C 11/0306* (2013.01); *B60C 11/13* (2013.01);
(Continued)

(58) Field of Classification Search
CPC . B60C 11/0304; B60C 11/0306; B60C 11/13; B60C 11/0309; B60C 11/1376;
(Continued)

(56) References Cited

U.S. PATENT DOCUMENTS 4,878,526 A * 11/1989 Ochiai .................... B60C 11/01
152/209.22
4,913,208 A 4/1990 Anderson et al.
(Continued)

FOREIGN PATENT DOCUMENTS

EP 3061628 A1 8/2016
JP H01-226407 A 9/1989
(Continued)

OTHER PUBLICATIONS

Jul. 4, 2017 Extended Search Report issued in European Patent Application No. 15819057.9.

*Primary Examiner* — Steven D Maki
*Assistant Examiner* — Philip N Schwartz
(74) *Attorney, Agent, or Firm* — Oliff PLC

(57) ABSTRACT

A block segment sections and outer rib-shaped sections are arranged in an outer shoulder land section. An end portion of one of vertical groove sections in one of L-shaped groove sections, which is at the other side in the tire circumferential direction communicates with one of the horizontal groove sections in another L-shaped groove section of the L-shaped groove sections, which is adjacent to the L-shaped groove section in the tire circumferential direction, via one of second communicating sections. In addition, positions of first communicating sections and the second communicating section in the tire width direction are different from each other.

6 Claims, 2 Drawing Sheets

(52) U.S. Cl.
CPC ...... *B60C 11/1369* (2013.01); *B60C 11/1376* (2013.01); *B60C 11/1384* (2013.01); *B60C 2011/039* (2013.01); *B60C 2011/0339* (2013.01); *B60C 2011/0353* (2013.01); *B60C 2011/0381* (2013.01)

(58) Field of Classification Search
CPC ............ B60C 11/1369; B60C 11/1384; B60C 2011/0339; B60C 2011/0381; B60C 2011/039; B60C 2011/0353
See application file for complete search history.

(56) References Cited

U.S. PATENT DOCUMENTS

| | | | |
|---|---|---|---|
| 6,823,911 B1* | 11/2004 | Himuro | B60C 11/0302 152/209.15 |
| 2003/0024621 A1* | 2/2003 | Neugebauer | B60C 11/11 152/209.22 |
| 2009/0114324 A1* | 5/2009 | Ohki | B60C 11/0309 152/209.23 |
| 2010/0200134 A1* | 8/2010 | Murata | B60C 11/0306 152/209.9 |

FOREIGN PATENT DOCUMENTS

| | | |
|---|---|---|
| JP | 2006-096062 A | 4/2006 |
| JP | 2008-155817 A | 7/2008 |
| JP | 2013-133080 A | 7/2013 |
| JP | 2013-147171 A | 8/2013 |
| JP | 2013-224132 A | 10/2013 |
| WO | 2010/008370 A1 | 1/2010 |
| WO | 2010-133940 A1 | 11/2010 |

\* cited by examiner

PNEUMATIC TIRE

TECHNICAL FIELD

The present invention relates to a pneumatic tire.

Priority is claimed on Japanese Patent Application No. 2014-141474, filed Jul. 9, 2014, the content of which is incorporated herein by reference.

BACKGROUND ART

As a pneumatic tire, a constitution in which a plurality of circumferential main grooves are formed at a tread surface at intervals in a tire width direction and a tire is partitioned into a plurality of land sections by the circumferential main grooves is known (for example, refer to Patent Document 1).

In the above-described pneumatic tire, a significantly large load (contact pressure) is applied to shoulder land sections of the land sections, which are located at an outermost portion in the tire width direction during high-speed turning and the like. For this reason, in order to improve steering stability during high-speed turning and the like, the rigidity of the shoulder land sections needs to be increased.

Here, for example, when all of the shoulder land sections are configured to have smooth surfaces to increase the rigidity of the shoulder land sections, a distribution of contact pressure easily lacks uniformity, and thus ground contact properties deteriorate.

On the other hand, a plurality of lug grooves extending in a tire width direction being formed at the shoulder land sections at intervals in a tire circumferential direction so that ground contact properties are improved can be conceived.

However, in this case, drainage can be improved, but block segment sections easily collapse and the rigidity of the shoulder land sections decreases. As such, it is difficult to obtain sufficient steering stability.

DOCUMENT OF RELATED ART

Patent Document

[Patent Document 1]
Japanese Unexamined Patent Application, First Publication No. 2013-224132

SUMMARY OF INVENTION

Technical Problem

In the above-described pneumatic tire, there is room for improvement in steering stability when drainage and ground contact properties are improved.

The present invention was made in view of the above-described problems, and an object of the present invention is to provide a pneumatic tire capable of improving drainage, ground contact properties, and steering stability in a well-balanced manner.

Solution to Problem

A pneumatic tire of the present invention is a pneumatic tire in which a plurality of circumferential main grooves are formed in a tread surface at intervals in a tire width direction, and which is partitioned into a plurality of land sections by the circumferential main grooves, wherein: block segment sections in which a plurality of L-shaped grooves having horizontal groove sections which extend in the tire width direction, inner end portions of which are coupled to the circumferential main grooves, and outer end portions of which terminate in the shoulder land section and vertical groove sections which extend in a tire circumferential direction, one end portions of which communicate with outer end portions of the horizontal groove sections via first communicating sections are formed to be arranged in the tire circumferential direction, and are partitioned by the L-shaped grooves adjacent to each other in the tire circumferential direction and the circumferential main grooves; and outer rib-shaped sections which are located outward from the L-shaped grooves in the tire width direction and continuously extend in the tire circumferential direction are arranged at at least one side of the shoulder land sections located at both sides of the plurality of land sections in the tire width direction, an end portion of one of the vertical groove sections at the other side in the tire circumferential direction in one of the L-shaped grooves communicates with one of the horizontal groove sections in another L-shape groove of the L-shaped grooves, which is adjacent to the L-shaped groove section in the tire circumferential direction, via one of second communicating sections, and positions of the first communicating sections and the second communicating sections in the tire width direction are different from each other.

Advantageous Effects of Invention

According to the present invention, drainage, ground contact properties, and the steering stability can be improved in a well-balanced manner.

DESCRIPTION OF EMBODIMENTS

Figure 1:
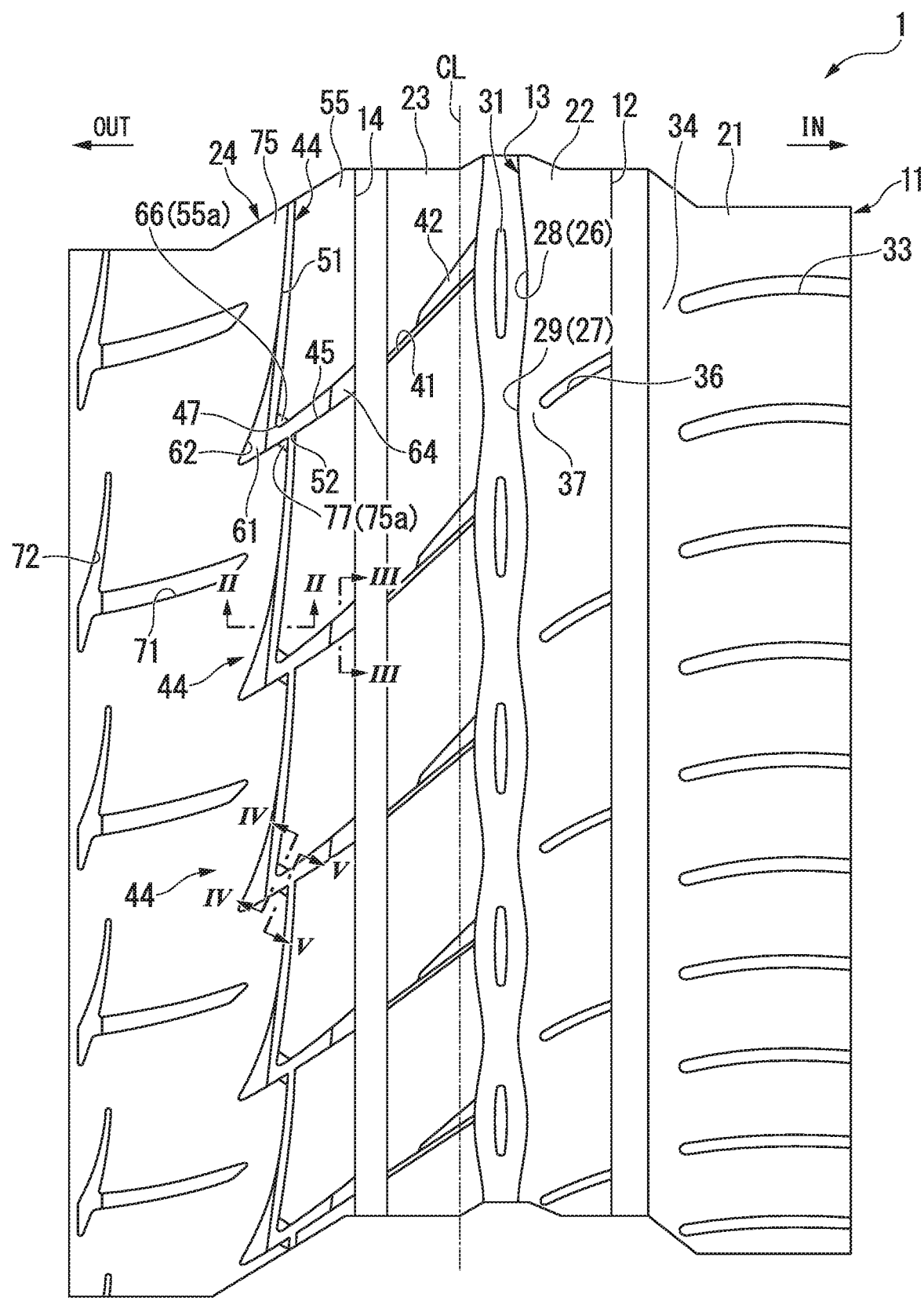
FIG. 1 is a plan view showing a portion of a tread surface of a pneumatic tire in an embodiment related to the present invention.

Hereinafter, an embodiment of a pneumatic tire related to the present invention will be described with reference to the drawings.

Note that an arrow IN in the drawings indicates an inside (hereinafter simply referred to as an inside in a tire width direction) when a pneumatic tire 1 is mounted at a vehicle, and an arrow OUT therein indicates an outside (hereinafter simply referred to as an outside in the tire width direction) when the pneumatic tire 1 is mounted at a vehicle. In addition, a dashed-dotted line CL indicates a tire equatorial surface. The pneumatic tire 1 in this embodiment has a pattern of asymmetry with respect to left and right sides around a tire equatorial surface CL and is mounted on the vehicle such that the left side in the drawing is located at the outside in the tire width direction and the right side in the drawing is located at an inside in the tire width direction.

As shown in FIG. 1, in the pneumatic tire 1 of this embodiment, a plurality of circumferential main grooves 12 to 14 are formed on a tread surface 11, and a plurality of land sections 21 to 24 are partitioned using the circumferential main grooves 12 to 14.

Note that a well-known bead core, carcass ply, steel belt, or the like (not shown) is buried in the pneumatic tire 1 of this embodiment.

Also, the above-described tread surface 11 refers to a ground plane in a tread section with respect to a defined internal pressure or a defined load defined in industry standards (for example, "JATMA Year Book" in Japan, "TRA Year Book" in the United States of America, "ETRTO Standard Manual" in Europe, and the like) for every region in which the pneumatic tire 1 is produced or used.

Three grooves such as the circumferential main grooves 12 to 14 are formed in the tread surface 11 in the tire width direction at intervals. To be specific, the circumferential main grooves 12 to 14 have an inner main groove 12 and a central main groove 13 which are located inward from the tire equatorial surface CL in the tire width direction and an outer main groove 14 which is located outward from the tire equatorial surface CL in the tire width direction. Note that, in the illustrated example, a distance from the tire equatorial surface CL to the inner main groove 12 in the tire width direction is longer than a distance from the tire equatorial surface CL to the outer main groove 14 in the tire width direction. Also, groove widths in opening edges of the circumferential main grooves 12 to 14 in the tire width direction may, for example, be 7 mm or more.

The groove widths of the inner main groove 12 and the outer main groove 14 are formed with a uniform width over an entire circumference in a tire circumferential direction. Note that, in the illustrated example, the groove width of the inner main groove 12 is wider than the groove width of the outer main groove 14.

The central main groove 13 is configured such that wide-width sections 26 with a wide groove width and narrow-width sections 27 with a narrower groove width than the wide-width sections 26 are alternately continuously provided in the tire circumferential direction. To be specific, protruding concave sections 28 configured to widen a groove width of the central main groove 13 and protruding protrusions 29 configured to narrow the groove width thereof alternately extend in both groove walls configured to define the central main groove 13 in the tire circumferential direction. In a planar view when viewed in a tire radial direction, the protruding concave sections 28 and the protruding protrusions 29 are formed in curved shapes, and smoothly continuous with each other in the tire circumferential direction. Therefore, both groove walls configured to define the central main groove 13 have wave shapes in the planar view when viewed in the tire radial direction. The protruding concave sections 28 and the protruding protrusions 29 are arranged to be opposite to each other in the tire width direction.

Thus, the wide-width sections 26 described above are formed at portions of the central main groove 13, in which the protruding concave sections 28 are opposite to each other in the tire width direction, and the narrow-width sections 27 described above are formed at portions of the central main groove 13, in which the protruding protrusions 29 are opposite to each other in the tire width direction.

Projections 31, which project outward in the tire radial direction, are formed at a portion of a groove bottom section configured to define the central main groove 13, which is located at the wide-width sections 26.

Top surfaces of the projections 31, which are located at an outside in the tire radial direction, are located further inward in the tire radial direction than an outer circumferential surface of the tread surface 11. Also, sizes of the projections 31 in the tire width direction gradually decrease from central portions thereof in the tire circumferential direction toward the outside thereof. In the illustrated example, the projections 31 are separated from the groove walls of the central main groove 13 in the tire width direction.

Four land sections 21 to 24 are formed at the tread surface 11 at intervals in the tire width direction. To be specific, the land sections 21 to 24 have an inner shoulder land section 21 located on an inner side of the inner main groove 12 in the tire width direction, a first central land section 22 located between the inner main groove 12 and the central main groove 13, a second central land section 23 located between the central main groove 13 and the outer main groove 14, and an outer shoulder land section (a shoulder land section) 24 located on an outer side of the outer main groove 14 in the tire width direction. Therefore, the inner shoulder land section 21 and the first central land section 22 among the land sections 21 to 24 are located further inward in the tire width direction than the tire equatorial surface CL, and the outer shoulder land section 24 is located further outward in the tire width direction than the tire equatorial surface CL. Also, the second central land section 23 is located on the tire equatorial surface CL. Note that, in the illustrated example, the tire equatorial surface CL is located around an inner end portion of the second central land section 23 in the tire width direction.

Land section widths of the central land sections 22 and 23 in the tire width direction among the land sections 21 to 24 are narrower than those of the shoulder land sections 21 and 24. In addition, the land section width of the inner shoulder land section 21 is narrower than that of the outer shoulder land section 24.

Inner horizontal grooves 33 extending in the tire width direction are formed in the inner shoulder land section 21 at intervals in the tire circumferential direction. Inner end portions of the inner horizontal grooves 33 in the tire width direction open to the inside in the tire width direction from the tread surface 11, and outer end portions thereof in the tire width direction terminate in the inner shoulder land section 21. Therefore, an inner rib-shaped section 34 continuously extending over the entire circumference in the tire circumferential direction is formed at a portion of the inner shoulder land section 21, which is located at an outside of the inner horizontal grooves 33 in the tire width direction. Also, the inner horizontal grooves 33 have curved shapes which extend and curve toward one side thereof in the tire circumferential direction as they go outward in the tire width direction.

First central horizontal grooves 36 extending in the tire width direction are formed in the first central land section 22 at intervals in the tire circumferential direction. Inner end portions of the first central horizontal grooves 36 in the tire width direction open to the inner main groove 12 described above, and outer end portions thereof in the tire width direction terminate in the first central land section 22. Therefore, a central rib-shaped section 37 continuously extending over the entire circumference in the tire circumferential direction is formed at a portion of the first central land section 22, which is located at an outside of the first central horizontal grooves 36 in the tire width direction. The first central horizontal grooves 36 extend toward one side in the tire circumferential direction as they go outward in the tire width direction. The first central horizontal grooves 36 are formed at different positions from the inner horizontal grooves 33 in the tire circumferential direction. Also, a gap between the first central horizontal grooves 36 is wider in the tire circumferential direction than a gap between the inner horizontal grooves 33.

Second central horizontal grooves 41 extending in the tire width direction are formed in the second central land section 23 at intervals in the tire circumferential direction. Inner end portions of the second central horizontal grooves 41 in the tire width direction open to the wide-width sections 26 of the central main groove 13 described above, and outer end portions thereof in the tire width direction open to the outer main groove 14 described above. In other words, the second central horizontal grooves 41 cross the second central land section 23 in the tire width direction. The second central horizontal grooves 41 extend toward one side in the tire circumferential direction as they go outward in the tire width direction. The second central horizontal grooves 41 are formed at positions different from those of the first central horizontal grooves 36 in the tire circumferential direction. Also, a gap between the first central horizontal grooves 41 has the same size in the tire circumferential direction as a gap between the central horizontal grooves 36.

Chamfered sections 42 are formed at portions of second central horizontal groove walls configured to define the second central horizontal grooves 41, which are located at the other sides in the tire circumferential direction. The chamfered sections 42 extend inward in the tire radial direction as they go toward one side from the other side in the tire circumferential direction. In addition, widths of the chamfered sections 42 in the tire circumferential direction gradually increase inward from the outside thereof in the tire width direction. Also, inner end portions of the chamfered sections 42 in the tire width direction open to the central main groove 13, and outer end portions thereof in the tire width direction terminate in the second central land section 23.

L-shaped grooves 44 formed in an L shape in a planar view when viewed in the tire radial direction are arranged and formed at the outer shoulder land section 24 in the tire circumferential direction. The L-shaped grooves 44 have horizontal groove sections 45 which extend in the tire width direction, inner end portions of which open to the outer main groove 14, and outer end portions of which terminate in the outer shoulder land section 24 and vertical groove sections 51 which extend in the tire circumferential direction, one end portions in the tire circumferential direction of which communicate with outer end portions of the horizontal groove sections 45 via first communicating sections 47. Note that groove depths of the horizontal groove sections 45 and the vertical groove sections 51 are preferably shallower than groove depths of the circumferential main grooves 12 to 14 described above. Thus, collapsing of block segment sections 55 can be suppressed by securing rigidity of the block segment sections 55 which will be described below.

The horizontal groove sections 45 extend toward one side in the tire circumferential direction as they go outward in the tire width direction and are disposed at positions equivalent to that of the second central horizontal grooves 41 disclosed above in the tire circumferential direction. Also, a gap between the horizontal groove sections 45 is the same in the tire circumferential direction as a gap between the second central horizontal grooves 41.

Groove widths of the horizontal groove sections 45 in the tire circumferential direction gradually decrease outward in the tire width direction. In this case, a maximum groove width (a groove width at inner end portions thereof in the tire width direction) of the horizontal groove sections 45 is preferably narrower than the groove widths of the circumferential main grooves 12 to 14 described above, and a minimum groove width (a groove width at outer end portions thereof in the tire width direction) is preferably 5 mm or less. Thus, rigidity of the block segment sections 55 described above can be secured in a state in which drainage is secured. Note that the horizontal groove sections 45 in this embodiment constitute tapered sections of which groove widths gradually decrease throughout the entire tapered sections in the tire width direction.

The vertical groove sections 51 extend inward in the tire width direction as they go from one side toward the other side in the tire circumferential direction. Also, one end portions of the vertical groove sections 51 in the tire circumferential direction communicate with the outer end portions of the horizontal groove sections 45 via the first communicating sections 47. An end portion of one of the vertical groove sections 51 at the other side in the tire circumferential direction communicates with one of the horizontal groove sections 45 in another L-shaped groove section 44 of L-shaped groove sections 44, which is adjacent to one L-shaped groove sections 44 in the tire circumferential direction, via second communicating sections 52 located further inward in the tire width direction than the first communicating sections 47. In other words, positions of the first communicating sections 47 and the second communicating sections 52 in the tire width direction are different from each other. For this reason, the horizontal groove sections 45 project further outward in the tire width direction than the end portions of the vertical groove sections 51 at the other side in the tire circumferential direction.

As described above, the L-shaped grooves 44 adjacent to each other in the tire circumferential direction are coupled via the second communicating sections 52 so that the L-shaped grooves 44 extend over the entire circumference in the tire circumferential direction. In this case, the rectangular block segment sections 55 in the planar view when viewed in the tire radial direction are formed at the L-shaped grooves 44 (the horizontal groove sections 45 and the vertical groove sections 51 of the one L-shaped groove sections 44 and the horizontal groove sections 45 of the other L-shaped groove sections 44) and portions partitioned by the outer main groove 14 in the outer shoulder land section 24.

Figure 2:
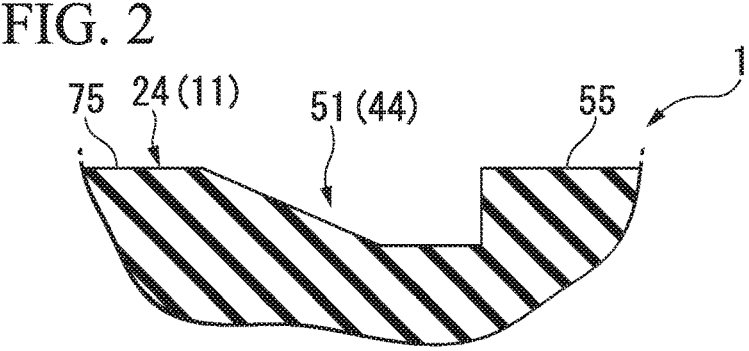
FIG. 2 is a cross-sectional view taken along line II-II of FIG. 1.

As shown in FIGS. 1 and 2, the one end portions of the vertical groove sections 51 in the tire circumferential direction are tapered sections 62 in which groove widths of the vertical groove sections 51 gradually increase outward in the tire width direction as they go toward one side in the tire circumferential direction. Outer walls of groove walls defining the tapered sections 62, which are located at an outside in the tire width direction, are inclined surfaces 61 extending outward in the tire radial direction as they go outward in the tire width direction. The inclined surfaces 61 are formed in triangular shapes in the planar view when viewed in the tire radial direction, and sizes thereof in the tire width direction increase from one side toward the other side in a circumferential direction thereof. Also, outer end portions of the inclined surfaces 61 in the tire width direction extend to an outer circumferential surface of an outer rib-shaped section 75, and inner end portions thereof extend to groove bottom sections of the vertical groove sections 51. Note that, in the illustrated example, lengths of the vertical groove sections 51 in the tire circumferential direction of the tapered sections 62 are about half those of the vertical groove sections 51. Also, walls of the groove walls defining the tapered sections 62 (the vertical groove sections 51), which are located at one side in the tire circumferential direction, are smooth surfaces extending in the tire radial direction.

Note that groove widths of portions in the vertical groove sections 51, which are other than the tapered sections 62, are preferably narrower than the groove widths of the horizontal groove sections 45, and are, for example, preferably 3 mm or less. Thus, since gaps between the block segment sections 55 and the outer rib-shaped section 75, which will be described below, in the tire width direction can be narrowed, the block segment sections 55 and the outer rib-shaped section 75 support each other in the tire width direction. As a result, collapsing of the block segment sections 55 is suppressed, and thus steering stability can be improved during high-speed turning and the like. Also, the vertical groove sections 51 may be sipes.

Figure 3:
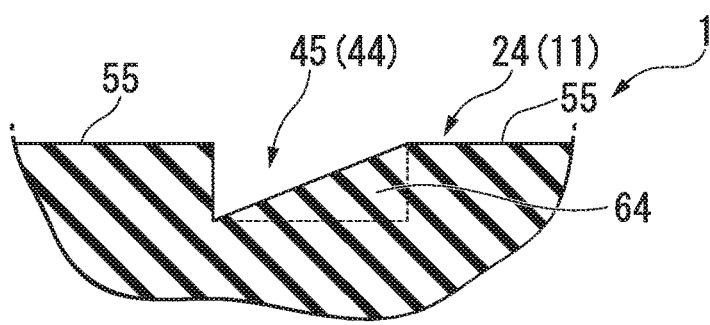
FIG. 3 is a cross-sectional view taken along line of FIG. 1.

As shown in FIGS. 1 and 3, coupling sections 64 configured to couple the block segment sections 55 extending in the tire circumferential direction and adjacent to each other in the tire circumferential direction are formed at portions in the horizontal groove sections 45, which are located at insides in the tire width direction. The coupling sections 64 protrude from groove bottom sections defining the horizontal groove sections 45 outward in the tire radial direction, and are inclined inward in the tire radial direction as outer circumferential surfaces thereof (top surfaces thereof) go from one side toward the other side in the tire circumferential direction. To be specific, one end portions of outer circumferential surfaces of the coupling sections 64 in the tire circumferential direction extend to an outer circumferential surface of one of the block segment sections 55, and the end portions thereof at the other side in the tire circumferential direction extend to another block segment section 55 adjacent to one of the block segment sections 55 in the tire circumferential direction at the groove bottom section side of the horizontal groove sections 45.

In addition, inner end portions of the coupling sections 64 in the tire width direction are coupled to the outer main groove 14, and outer end portions thereof in the tire width direction terminate in the horizontal groove sections 45. The outer end portions of the coupling sections 64 in the tire width direction are inclined inward in the tire radial direction as they go outward in the tire width direction.

Figure 4:
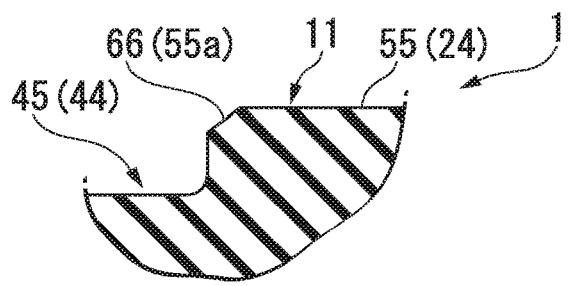
FIG. 4 is a cross-sectional view taken along line IV-IV of FIG. 1.

As shown in FIGS. 1 and 4, a block corner 55a of four corners of the block segment sections 55, which is formed by one of the horizontal groove sections 45 and one of the vertical groove sections 51 in one of the one L-shaped grooves 44 has an acute angle. Also, a block chamfered section (a first chamfered section) 66 extending inward in the tire radial direction as it goes toward an apex of one of the block corners 55a is formed at an outer circumferential surface of the block corner 55a.

Figure 5:
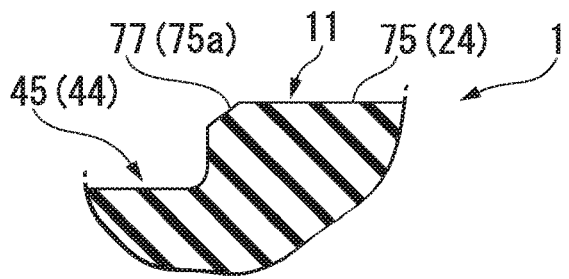
FIG. 5 is a cross-sectional view taken along line V-V of FIG. 1.

As shown in FIG. 1, portions of the outer shoulder land section 24, which are located at an outside of the L-shaped grooves 44 in the tire width direction, constitute the outer rib-shaped section 75 extending over the entire circumference in the tire circumferential direction. An inner edge of the outer rib-shaped section 75 in the tire width direction extends in accordance with outer edges of the L-shaped grooves 44 in the tire width direction and extends in the tire circumferential direction to be serpentine in the tire width direction. In this case, as shown in FIGS. 1 and 5, rib-shaped corners 75a of the outer rib-shaped section 75, which are formed by the horizontal groove sections 45 of the one L-shaped grooves 44 and the vertical groove sections 51 of the other L-shaped grooves 44, have acute angles. Also, rib-shaped chamfered sections (second chamfered sections) 77 extending inward in the tire radial direction as they go toward apexes of the rib-shaped corners 75a are formed at outer circumferential surfaces of the rib-shaped corners 75a.

Here, as shown in FIG. 1, the block corners 55a and the rib-shaped corners 75a, which are described above, face each other in the tire circumferential direction to surround the horizontal groove sections 45. In this embodiment, the apexes of the rib-shaped corners 75a are located on an inner side of the apexes of the block corners 55a described above in the tire width direction.

Outer horizontal groove sections 71 extending in the tire width direction are formed in the outer rib-shaped section 75 at intervals in the tire circumferential direction. The outer horizontal groove sections 71 extend toward one side in the tire circumferential direction as they go outward in the tire width direction, and are formed at positions of the L-shaped grooves 44 in the outer rib-shaped section 75, which are different from those of the horizontal groove sections 45 in the circumferential direction. Therefore, the horizontal groove sections 45 and the outer horizontal groove sections 71 are alternately arranged in the outer shoulder land section 24 in the tire circumferential direction. In other words, the outer rib-shaped section 75 extends over the entire circumference in the tire circumferential direction via portions located inward and outward from the outer horizontal groove sections 71 in the tire width direction. Note that, in the illustrated example, the positions of the outer horizontal groove sections 71 in the tire circumferential direction are equivalent to intermediate positions of the vertical groove sections 51.

Inner end portions of the outer horizontal groove sections 71 in the tire width direction extend up to positions at which the inner end portions thereof and outer end portions (apexes of the tapered sections 62) of the L-shaped grooves 44 (the vertical groove sections 51) described above in the tire width direction overlap each other, and outer end portions thereof in the tire width direction terminate in the outer rib-shaped section 75. Note that, in the case of the inner end portions of the outer horizontal groove sections 71 in the tire width direction, the groove widths thereof in the tire circumferential direction gradually increase inward in the tire width direction.

Also, outer vertical groove sections 72 intersecting the outer end portions of the outer horizontal groove sections 71 in the tire width direction are formed in the outer rib-shaped section 75. The outer vertical groove sections 72 extend inward in the tire width direction as they go from one side toward the other side in the tire circumferential direction. In the case of portions of the outer vertical groove sections 72, which are located at one sides of portions, at which the outer vertical groove sections 72 intersect the outer horizontal groove sections 71 in the tire circumferential direction, lengths thereof in the tire circumferential direction are shorter than those of portions thereof, which are located at the other side in the tire circumferential direction. Note that groove widths of the outer vertical groove sections 72 in the tire width direction from one side toward the other side in the tire circumferential direction gradually decrease.

As described above, according to this embodiment, the L-shaped grooves 44 which communicate with the outer main groove 14 are formed at the outer shoulder land section 24 so that drainage at a wet road surface can be improved.

The block segment sections 55 partitioned by the L-shaped grooves 44 and the outer main groove 14 adjacent to each other in the tire circumferential direction are formed at the outer shoulder land section 24 so that flexibility is given to the outer shoulder land section 24 and thus distribution of contact pressure can be uniformized. As such, ground contact properties can be improved.

In addition, the outer rib-shaped section 75 is formed further outward from the outer shoulder land section 24 in the tire width direction than the L-shaped grooves 44 so that the block segment sections 55 are supported by the outer rib-shaped section 75 in the tire width direction. As a result, collapsing of the block segment sections 55 is suppressed, and thus steering stability can be improved during high-speed turning and the like.

Particularly, in this embodiment, the second communicating sections 52 are located further inward in the tire width direction than the first communicating sections 47. As such, the block corners 55a of the block segment sections 55 face the rib-shaped corners 75a of the outer rib-shaped section 75 in the tire circumferential direction. For this reason, the block segment sections 55 are supported by the outer rib-shaped section 75 in the tire circumferential direction so that rigidity of the entire outer shoulder land section 24 can be secured. Thus, even when a great load is applied to the outer shoulder land section 24 during high-speed turning or the like, collapsing of the block segment sections 55 is suppressed, and thus steering stability can be improved.

As a result, drainage, ground contact properties, and steering stability can be improved in a well-balanced manner.

In this embodiment, the block corners 55a of the block segment sections 55 are formed at acute angles so that flexibility is given to the block corners 55a, and thus ground contact properties can be further improved. In addition, the chamfered sections 66 are formed at the block corners 55a so that chipping of the block corners 55a is minimized, and thus durability thereof can be improved.

In this embodiment, the coupling sections 64 coupling the block segment sections 55 adjacent to each other in the tire circumferential direction are formed in the horizontal groove sections 45 so that the block segment sections 55 adjacent to each other in the tire circumferential direction support each other. Thus, rigidity of the outer shoulder land section 24 in the tire circumferential direction is improved, and thus a braking performance or a traction performance can be improved.

In addition, the coupling sections 64 are located at inner end portions inside the horizontal groove sections 45. As such, rigidity of portions of the horizontal groove sections 45, which are coupled to the outer main groove 14, can be secured. The outer circumferential surface of each of the coupling sections 64 extends inward in the tire radial direction as the outer circumferential surface thereof goes from an outer circumferential surface of one of the block segment sections 55 toward another block segment section 55. As such, the above-described braking performance or traction performance can be secured in a state in which drainage of water inside the outer main groove 14 passing through the horizontal groove sections 45 is secured.

In this embodiment, the outer horizontal groove sections 71 are formed at portions of the outer rib-shaped section 75, which are different from those of the horizontal groove sections 45 in the tire circumferential direction. As such, drainage can be further improved in a state in which an increase in rigidity of the outer shoulder land section 24 is minimized.

In this embodiment, the groove widths of the horizontal groove sections 45 gradually decrease outward in the tire width direction. As such, rigidity and a ground contact area at an outside of the outer shoulder land section 24 in the tire width direction can be secured in a state in which drainage is secured using the horizontal groove sections 45 at regions inside the outer shoulder land section 24 in the tire width direction.

The tapered sections 62 are provided at one end portions of the vertical groove sections 51 in the tire circumferential direction. As such, ends of the vertical groove sections 51 in the tire circumferential direction can be separated from the block corners 55a and the rib-shaped corners 75a described above. For this reason, a stress concentration in the vicinity of the ends and the corners 55a and 75a is suppressed, and thus durability can be improved. In addition, the outer walls of the groove walls defining the tapered sections 62, which are located at an outside in the tire width direction, are the inclined surfaces 61. As such, cracks and the like of the outer walls are suppressed, and thus durability can be improved.

Also, the rib-shaped corners 75a of the outer rib-shaped section 75 are formed to have acute angles so that flexibility is given to the outer rib-shaped section 75, and thus ground contact properties can be further improved. The rib-shaped chamfered sections 77 are formed at the rib-shaped corners 75a so that chipping and the like of the rib-shaped corners 75a is minimized, and thus durability can be improved.

Note that the technical scope of the present invention is not limited to the above-described embodiments, and various modifications can be made without departing from the gist of the present invention.

For example, in the above-described embodiments, a constitution in which three circumferential main grooves 12 to 14 are provided has been described, but the present invention is not limited thereto. In addition, a plurality (such as two or four or more) of circumferential main grooves may be provided.

Also, in the above-described embodiments, a constitution in which the block segment sections 55 and the outer rib-shaped section 75 are formed at the outer shoulder land section 24 has been described. However, the block segment sections 55 and the outer rib-shaped section 75 may be formed at at least the outer shoulder land section 24, and for example, the inner shoulder land section 21 may have the same constitution as the outer shoulder land section 24.

In the above-described embodiments, a constitution in which the groove width along the entire horizontal groove sections 45 in the tire width direction gradually decrease has been described, but the present invention is not limited thereto. In addition, the groove widths thereof may be configured to gradually decrease in at least a portion of the range in the tire width direction.

In the above-described embodiments, a constitution in which the tapered sections 62 are formed at one end portions of the vertical groove sections 51 in the tire circumferential direction has been described, but the present invention is not limited thereto. In addition, the tapered sections may be formed throughout the entire vertical groove sections 51.

In the above-described embodiment, a constitution in which the second communicating sections 52 are located inward from the first communicating sections 47 in the tire width direction has been described, but the present invention is not limited thereto. In other words, the first communicating sections 47 may be located inward from the second communicating sections 52 in the tire width direction as long as positions of the first communicating sections 47 and the second communicating sections 52 in the tire circumferential direction are different from each other. In this case, the vertical groove sections 51 may be formed to extend inward in the tire width direction as they go toward one side from the other side in the tire circumferential direction.

Moreover, the component elements of the above-mentioned embodiment can be appropriately substituted with known components or the above-mentioned variants may be appropriately combined without departing from the gist of the present invention.

INDUSTRIAL APPLICABILITY

According to the present invention, drainage, ground contact properties, and steering stability can be improved in a well-balanced manner.

REFERENCE SIGNS LIST

1 Pneumatic tire
11 Tread surface
12 to 14 Circumferential main groove
21 to 24 Land section
24 Outer shoulder land section (shoulder land section)
44 L-shaped groove
45 Horizontal groove section
47 First communicating section
51 Vertical groove section
52 Second communicating section
55 Block segment section
55a Block corner
62 Tapered section
64 Coupling section
66 Block chamfered section (first chamfered section)
71 Outer horizontal groove section
75 Outer rib-shaped section
75a Rib-shaped corner
77 Rib-shaped chamfered section (second chamfered section)

The invention claimed is:

1. A pneumatic tire in which a plurality of circumferential main grooves are formed in a tread surface at intervals in a tire width direction, and which is partitioned into a plurality of land sections by the circumferential main grooves, wherein:
block segment sections in which a plurality of L-shaped grooves having horizontal groove sections which extend in the tire width direction, inner end portions of which are coupled to the circumferential main grooves, and outer end portions of which terminate in a shoulder land section and vertical groove sections which extend in a tire circumferential direction, one end portions of which communicate with outer end portions of the horizontal groove sections via first communicating sections are formed to be arranged in the tire circumferential direction, and are partitioned by the L-shaped grooves adjacent to each other in the tire circumferential direction and the circumferential main grooves;
outer rib-shaped sections which are located outward from the L-shaped grooves in the tire width direction and continuously extend in the tire circumferential direction are arranged at at least one side of shoulder land sections located at both sides of the plurality of land sections in the tire width direction;
an end portion of one of the vertical groove sections at the other side in the tire circumferential direction in one of the L-shaped grooves communicates with one of the horizontal groove sections in another L-shape groove of the L-shaped grooves, which is adjacent to the L-shaped groove section in the tire circumferential direction, via one of second communicating sections;
positions of the first communicating sections and the second communicating sections in the tire width direction are different from each other;
coupling sections configured to couple the block segment sections adjacent to each other in the circumferential direction are formed in the horizontal groove sections;
the coupling sections are located at inner end portions of the horizontal groove sections, and an outer circumferential surface of each of the coupling sections extends inward in the tire radial direction as it goes from an end portion of an outer circumferential surface of one block segment section of the block segment sections toward another block segment section of the block segment sections, which is adjacent to the one block segment section in the tire circumferential direction; and
inner end portions of the coupling sections in the tire width direction are coupled to an outer main groove, and outer end portions thereof in the tire width direction terminate in the horizontal groove sections.

2. The pneumatic tire according to claim 1, wherein a block corner of the L-shaped groove, which is formed by the vertical groove section and the horizontal groove section, among four corners in one of the block segment sections is formed to have an acute angle, and a first chamfered section extending inward in the tire radial direction as it goes toward an apex of the block corner is formed at an outer circumferential surface of the block corner.

3. The pneumatic tire according to claim 1, wherein outer horizontal groove sections extending in the tire width direction are arranged at the outer rib-shaped sections at intervals in the tire circumferential direction, and
positions of the outer horizontal groove sections and the horizontal groove sections in the tire circumferential direction are different from each other.

4. The pneumatic tire according to claim 1, wherein the horizontal groove sections include tapered sections in which groove widths of the horizontal groove sections in the tire circumferential direction decrease outward in the tire width direction.

5. The pneumatic tire according to claim 1, wherein one end portions of the vertical groove sections include tapered sections in which groove widths of the vertical groove sections in the tire width direction increase outward in the tire width direction as they go toward one side from the other side in the tire circumferential direction, and
outer walls of groove walls defining the tapered sections, which are located at an outside in the tire width direction, extend outward in the tire radial direction as they go outward in the tire width direction.

6. The pneumatic tire according to claim 1, wherein a rib-shaped corner of one of the outer rib-shaped sections, which is formed by the vertical groove section of the L-shaped groove section and the horizontal groove section of the other L-shaped groove section, is formed to have an acute angle, and second chamfered sections extending inward in the tire radial direction as they go toward apexes of the rib-shaped corners are formed at outer circumferential surfaces of the rib-shaped corners.

* * * * *